Sept. 29, 1931.  M. J. ANDERSON  1,825,038
CONVEYING APPARATUS
Original Filed Feb. 18, 1927  6 Sheets-Sheet 2

INVENTOR
MARTIN J. ANDERSON
BY Paul, Paul & Moore
ATTORNEYS

Sept. 29, 1931.  M. J. ANDERSON  1,825,038
CONVEYING APPARATUS
Original Filed Feb. 18, 1927  6 Sheets-Sheet 5

INVENTOR
MARTIN J. ANDERSON
BY Paul, Paul & Moore
ATTORNEYS

Patented Sept. 29, 1931

1,825,038

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING APPARATUS

Application filed February 18, 1927, Serial No. 169,282. Renewed September 8, 1930.

This invention relates to improvements in conveyer systems, and is an improvement to the form shown in my prior pending application, Serial #169,281, filed February 18th, 1927.

An object of this invention is to provide a conveying apparatus, comprising a main conveyer having branch conveyers leading therefrom to suitable storage bins or destinations, and the main conveyer having means for diverting packages or articles therefrom onto a selected branch conveyer, and each branch conveyer having means for automatically interrupting the diversion of packages thereonto, when such branch conveyer has been substantially filled with packages, such accumulation of packages thereon causing a mechanism to be operated to re-actuate the means for diverting packages onto the branch conveyer and causing following articles to continue onward over the main conveyer to be returned to the central dispatching station or point as a warning to the dispatcher that a given branch conveyer has been filled or is blocked with packages.

A further and more specific object of the invention is to provide a main conveyer having a plurality of branch conveyers leading therefrom, and further having a deflector positioned thereover at each branch conveyer for selectively diverting articles therefrom onto a selected branch conveyer; and each branch conveyer further having means for automatically releasing or re-actuating the deflector to cause following articles to be returned to their source in the event that the branch conveyer has been blocked or filled with packages or articles adjacent to the main conveyer.

A further object is to provide a conveying apparatus of the above character, comprising a routing tray adapted to have a control means adjustably positioned thereon and adapted to actuate certain mechanisms along the main conveyer to effect the diversion of packages therefrom onto a selected branch conveyer.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features as shown as various changes may be made within the scope of the claims which follow.

In the accompanying drawings forming a part of this specification.

Figure 1:
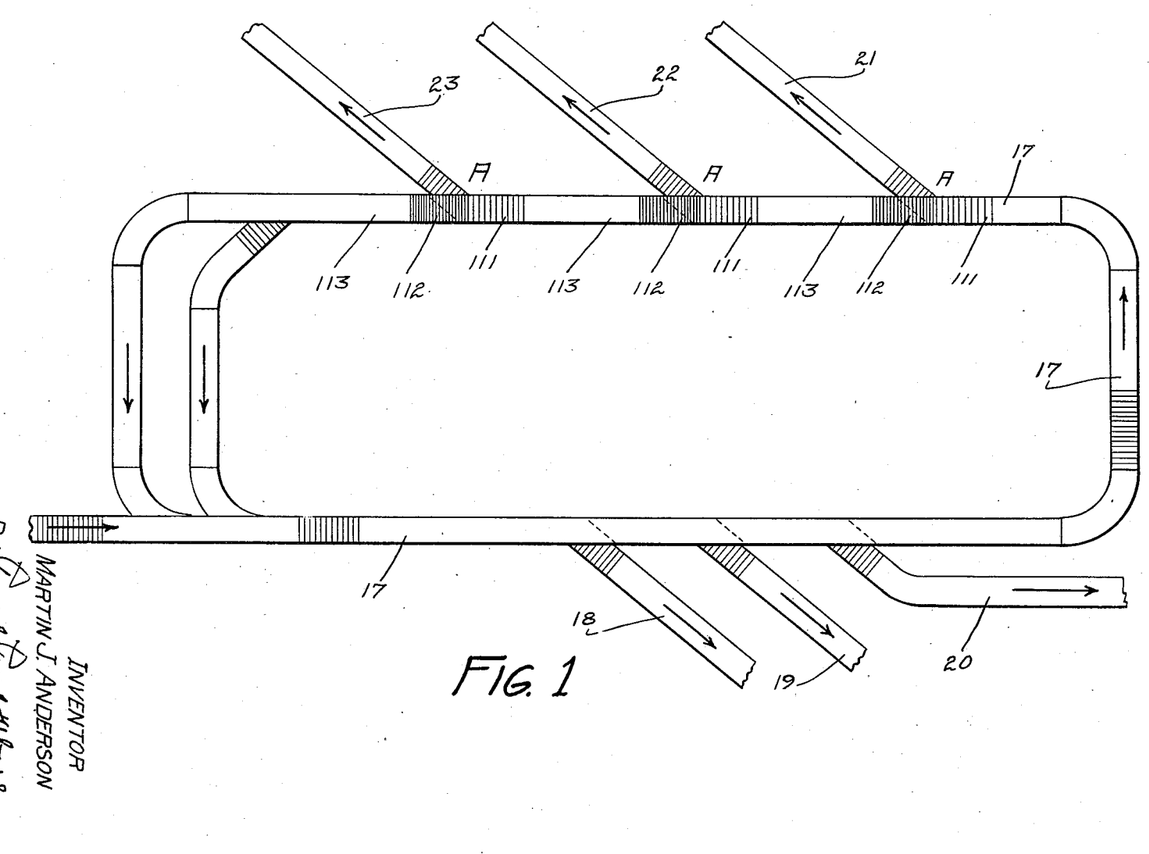
Figure 1 is a diagrammatic plan view of a conveyer system embodying my invention.

In the drawings Figure 1 illustrates a diagrammatic representation of a conveying apparatus such as shown and described in my pending application above mentioned. This apparatus comprises a main conveyer 17 having a plurality of branch conveyers 18, 19, and 20 leading therefrom to locations or destinations to which it may be desired to convey certain articles or packages for storage or other purposes. Similar branch conveyers 21, 22 and 23 are shown at the opposite side of the main conveyer and, likewise, lead to suitable storage bins or destinations, not shown.

Figures 2, 3, 4, 5:
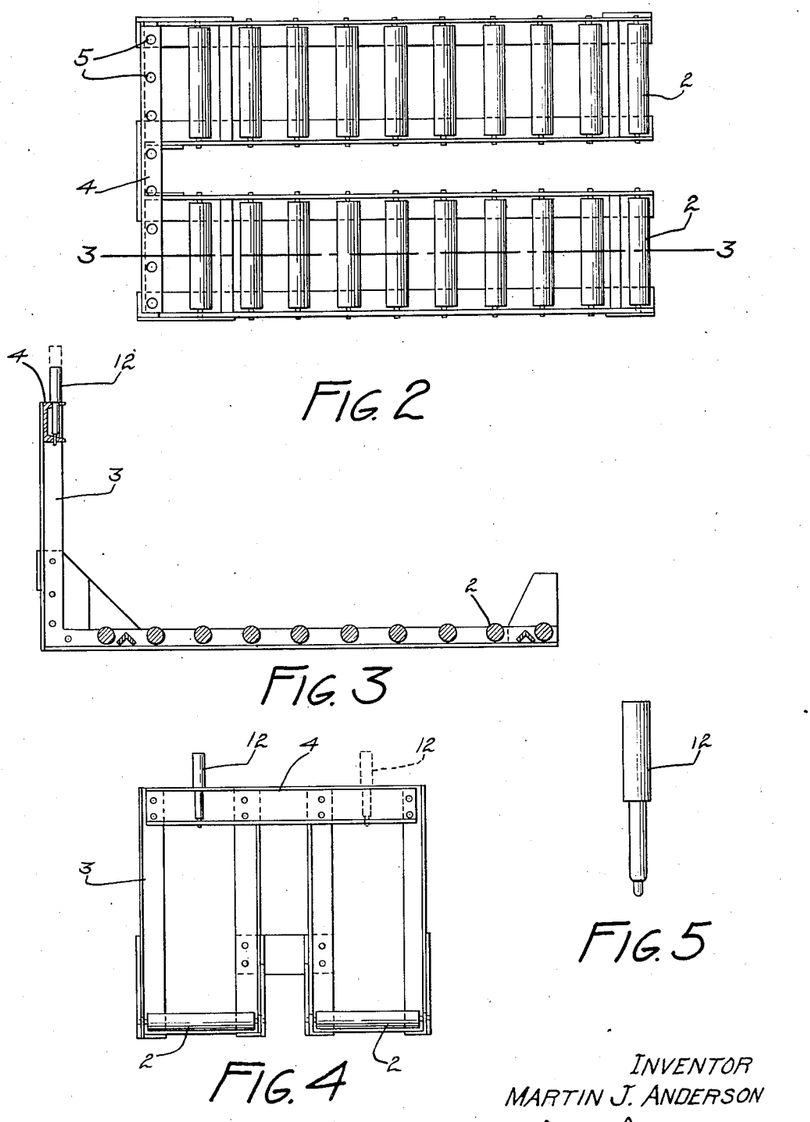
Figure 2 is a plan view of one of the routing trays showing the spaced apertures at the forward end thereof adapted to receive the control pins.
Figure 3 is a sectional elevation on the line 3—3 of Figure 2.
Figure 4 is a reduced rear end view of a routing tray.
Figure 5 is an enlarged detailed view of a control pin.
Figure 6:
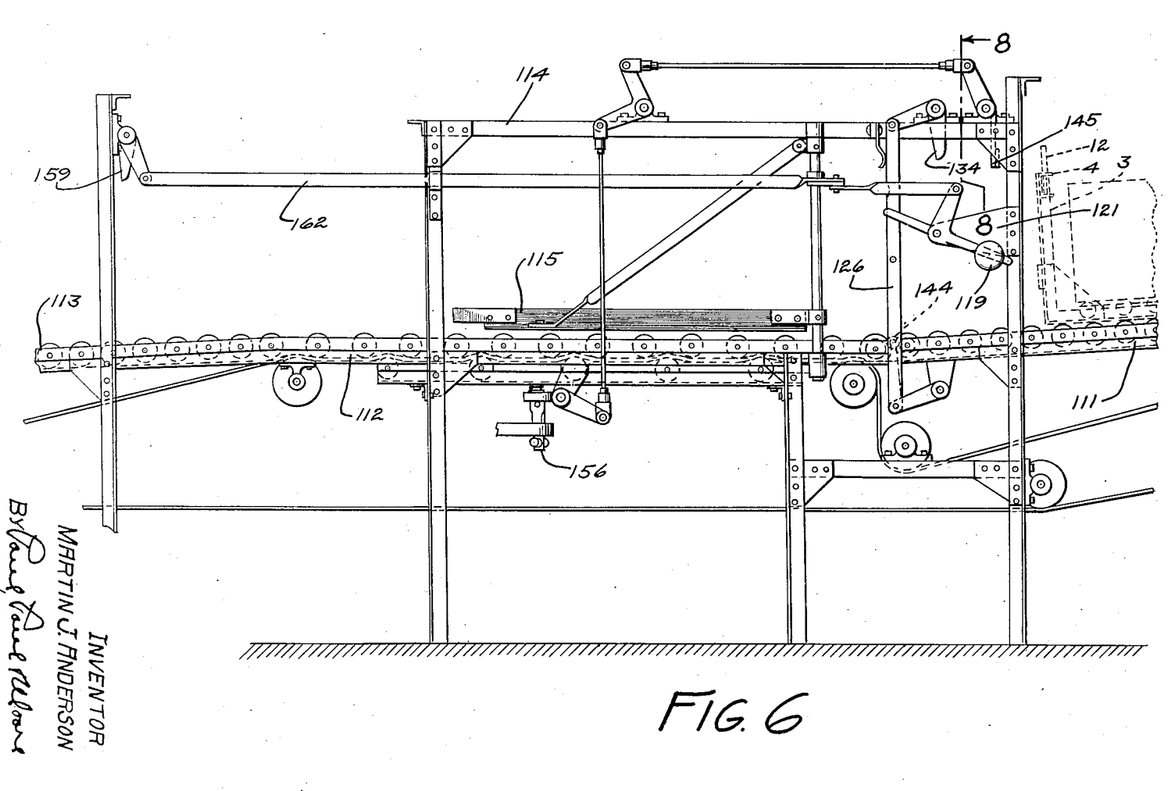
Figure 6 is an elevational view of the mechanism functioning to unload the package from the tray and also showing the deflector for diverting the packages from the main conveyer onto a branch conveyer, the parts being shown in normal inoperative position.

Suitable mechanisms are provided at the junctions A—A—A of the branch conveyers 21, 22 and 23, for diverting packages from the main conveyer onto a selected branch conveyer. These mechanisms are adapted to be selectively operated by a control means positioned upon a routing tray, shown in detail in Figures 2 to 5, inclusive. The routing tray comprises roller conveyer sections 2—2 having their forward ends connected together by means of an upright frame structure 3, having a transverse channel member 4 arranged at the upper portion thereof as shown. A plurality of apertures 5 are provided in the cross member 4 adapted to receive a control pin 12, shown in Figure 5. The position of the control pin upon the cross member 4 determines the selected branch conveyer onto which it is desired to divert the packages. This routing tray is shown and described in detail in my pending application above mentioned, and it is therefore thought unnecessary to describe same in detail in the present application.

The mechanism provided at the junctions A—A—A for diverting the packages from the main conveyer onto a selected branch conveyer is shown in detail in Figures 6, 7, 8, and 9. This mechanism is also shown and described in detail in the above mentioned pending application and it is therefore, thought unnecessary to describe same in detail in this application.

Briefly, the mechanism comprises a gravity roller section 111, a power driven conveyer section 112 and another gravity roller section 113, all forming a part of the main conveyer. A frame structure 114 is provided over the power driven conveyer section 112, and to this frame structure a deflector 115 is pivotally mounted adapted to swing to an inclined position over the conveyer section 112 for the purpose of diverting packages from the main conveyer onto a selected branch conveyer. The mechanism at each junction, for diverting packages from the main conveyer onto the branch conveyers 21, 22 and 23, are similar in construction, and it is therefore thought necessary to describe but one, like parts being referred to by like numerals.

Figures 8, 9:
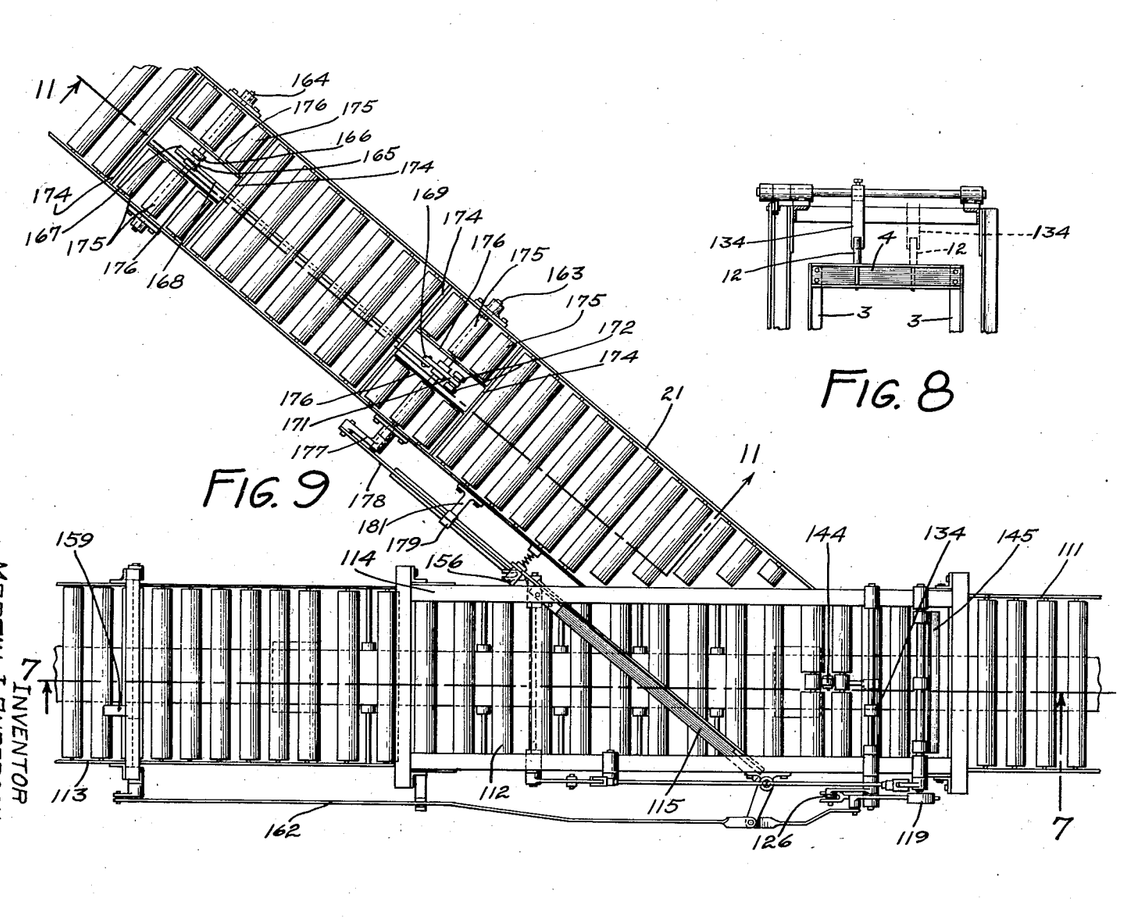
Figure 8 is a detail sectional view on the line 8—8 of Figure 6 showing the relative positions or transverse adjustments of the control pins upon the routing tray as required for the different branch conveyers.
Figure 9 is a plan view of Figure 7.

The deflector 115 is normally held in operative position as shown in full lines in Figure 9, and has a connection with a weighted arm 119 pivotally mounted upon a bracket 121, secured to the frame 114. This weighted arm constantly tends to move the deflector 115 to its inoperative position, shown in Figure 6. The control pin 12, positioned upon the cross member 4 of the routing tray, is adapted to engage a transverse bar 145 arranged over the gravity roller section 111. This bar 145 is operatively connected with a spring-actuated latch 156 which normally is positioned to engage the deflector 115 to retain it in operative position, as shown in full lines in Figure 9. When the control pin 12 engages the bar 145, the latch 156 will be moved out of engagement with the deflector 115, after which the weighted arm 119 will automatically move the deflector to its inoperative position, shown in Figure 6.

The routing tray is adapted to carry a package when sent over the conveyer system, and means are provided to unload this package from the routing tray and to temporarily hold it upon the gravity conveyer section 111, until the empty tray has had time to pass through the junction A and to actuate the mechanism causing the deflector 115 to be moved from its inoperative to its operative position over the main conveyer, after which the package, being temporarily held upon the gravity roller section 111, will be released. The package will then engage the deflector 115 and be diverted from the main conveyer onto the adjacent branch conveyer.

Figure 7:
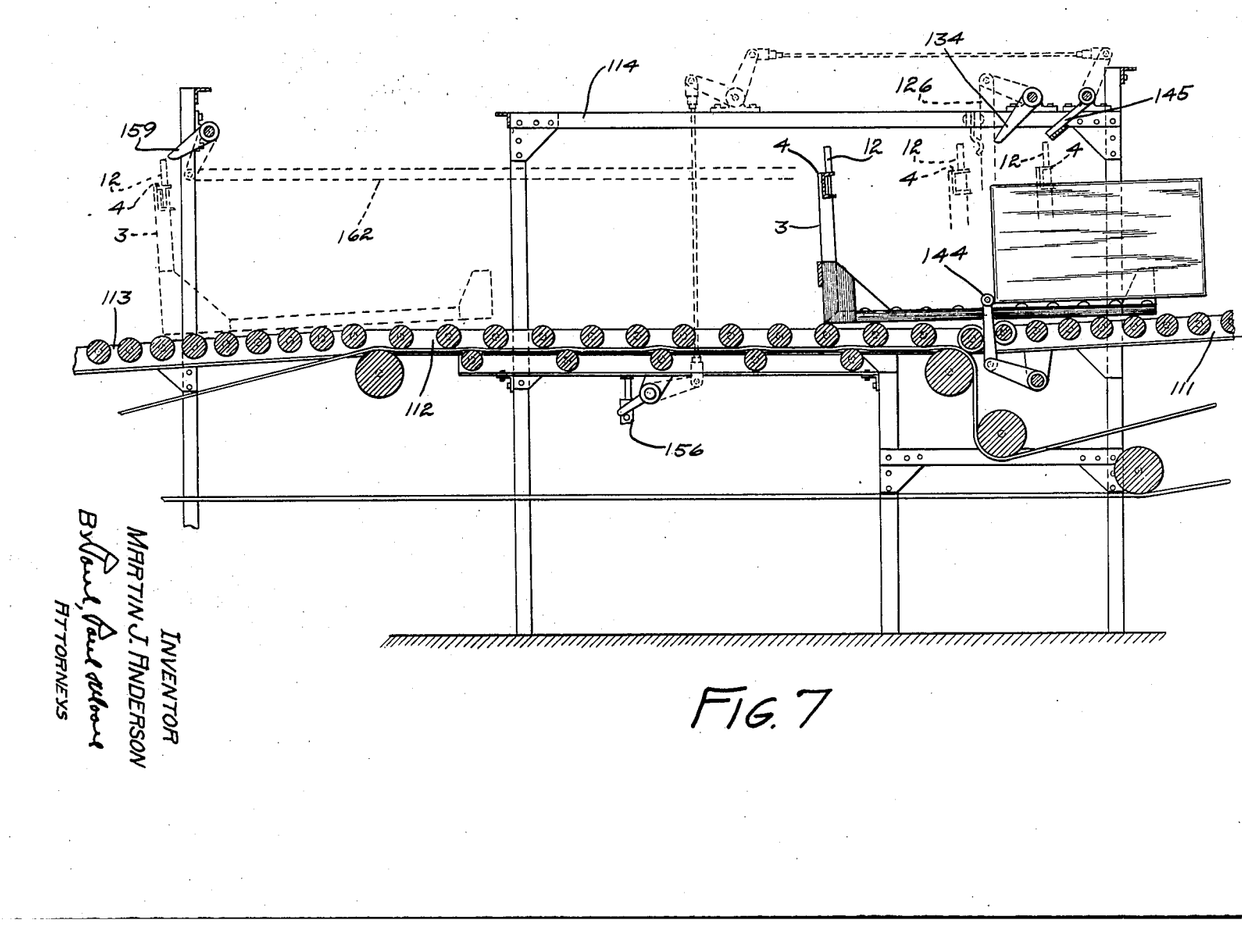
Figure 7 is a longitudinal sectional view on the line 7—7 of Figure 9 showing the means for engaging the package to unload it from the tray and to temporarily interrupt its travel while the tray continues onward to the dotted line position shown at the left hand side of Figure 7, which is the position assumed after having actuated the mechanism to release the packages and to move the deflector over the main conveyer to divert the packages onto the branch conveyer.

The package is unloaded from the tray by means of stop rollers 144 terminally mounted upon an arm 138, and adapted to be moved to a position above the top surface of the routing tray to engage the package, as shown in Figure 7. The rollers 144 are moved from their inoperative position, shown in dotted lines in Figure 6, to their operative position shown in Figure 7, by means of a depending finger 134 adapted to be engaged by the control pin 12 and having a connection with the rollers 144 by means of a link mechanism 126. When the stop rollers are thus moved into the path of the package positioned upon the routing tray, the routing tray will move out from under the package, causing the latter to be discharged onto the gravity roller section 111 where it will be temporarily held by the rollers 144. The routing tray will then continue onward over the power driven conveyer section 112 and onto the gravity roller section 113. As it passes over the roller section 113, the control pin 12 will engage a depending finger 159 and move it to the full line position shown in Figure 7. Such actuation of the finger 159 will cause the deflector 115 to be moved to its operative position over the main conveyer as shown in Figure 9. The finger 159 is operatively connected to the deflector 115 by means of a connection 162, shown in Figures 6 and 9, and the stop rollers 144 are also operatively connected with the finger 159 so that when the deflector is moved to its operative position, the rollers will be depressed to permit the packages to move on. Figure 8 is a view showing the control pin 12 engaging the depending finger 134 and also indicating that the finger 134 is adjustably mounted and that the control pin 12 may be laterally adjusted upon the tray to selectively effect the diversion of the packages from the main conveyer onto a selected branch conveyer. The transverse position of the control pin 12 upon the tray and also the transverse position of the depending fingers 134 and 159 control the selective actuation of the mechanism for operating the deflector 115, to cause the packages to be diverted onto a selected branch conveyer. After the routing tray has actuated the deflecting mechanism at a given junction A, it will continue onward over the main conveyer and will return to its source for further use in directing other packages over the conveyer system. Articles or packages following the routing tray will continue to be diverted onto the selected branch conveyer as a result of the routing tray having actuated the diverting mechanism, until another routing tray has been sent out over the main conveyer to reactuate the diverting mechanism to cause the packages to be diverted onto another branch conveyer.

An important feature of this invention resides in the means provided for automatically interrupting the diversion of packages from the main conveyer onto a selected branch conveyer in the event that such branch conveyer becomes filled or blocked with packages, after which following packages designated for that particular branch conveyer will be returned to the dispatcher as a warning that a selected branch conveyer has been filled or blocked with packages adjacent to the main conveyer. (See Figures 9, 10, and 11.)

Figure 9 illustrates one of the junctions A, showing a branch conveyer leading from the main conveyer to a suitable source, such as a storage bin, and, for purposes of explanation, this conveyer will be referred to as the first branch conveyer 21 (see Figure 1).

Underneath this branch conveyer are shafts 163 and 164, which are spaced apart slightly more than the maximum length of the packages to be conveyed thereover. These shafts are journaled in suitable bearings secured to the side rails of the conveyer. On shaft 164 is secured a rocker arm 165 which normally extends above the top of the rollers of the branch conveyer. Terminally mounted upon this rocker arm are two small anti-friction wheels 166. A depending arm 167 is secured to the hub of the rocker arm 165 and has a connection 168 connecting it with a similar arm 169, secured to the hub of a similar rocker arm 171, also having anti-friction wheels 172 terminally mounted thereon. The wheels 172 on the rocker arm 171 are normally positioned just below the level of the rollers of the branch conveyer as shown in dotted lines in Figure 10, so that the packages may pass thereover without interference. Tension springs 173 are attached to the rocker arms 165 and 171 and to cross members 174 and function to yieldably retain the rocker arms in the positions shown in Figure 10.

Figure 10:
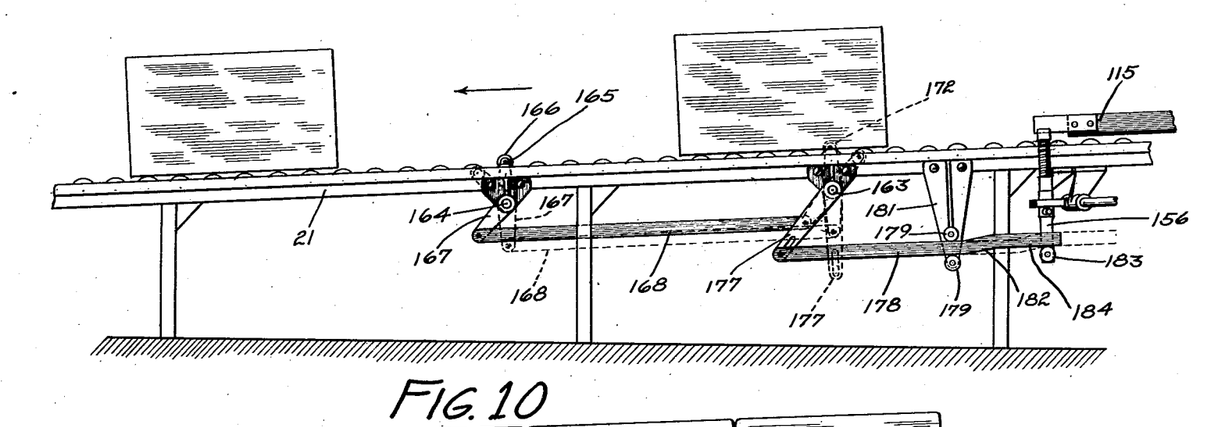
Figure 10 is a side elevation of a branch conveyer showing the mechanism provided thereon adjacent the main conveyer for interrupting the diversion of the packages thereonto when the branch conveyer becomes filled or blocked.
Figure 11:
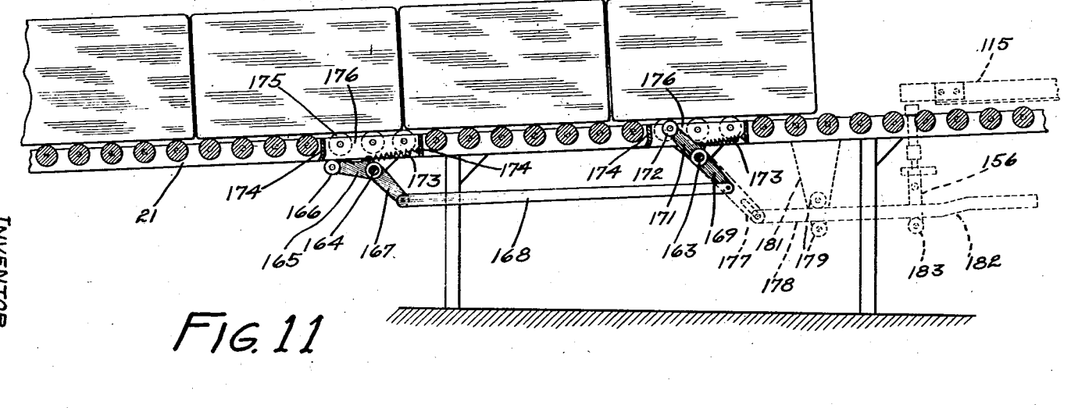
Figure 11 is a similar view in section showing the mechanism actuated by the accumulation of packages on the conveyer to release the deflector and permit the following packages to continue onward upon the main conveyer to be returned to the dispatcher or starting point.

A plurality of relatively shorter rollers 175 are mounted on the branch conveyer 21 at the point where the rocker arms 165 and 171 pass through, as shown in Figures 10 and 11. The inner ends of these rollers are supported upon members 176, having their ends terminally secured to the cross members 174, as shown in Figure 9. A crank arm 177 is terminally secured to the rock shaft 163 and has a cam bar 178 pivotally connected therewith, the other end of which is supported between a pair of guide wheels 179, mounted upon a depending bracket 181, secured to one of the side rails of the branch conveyer. This cam bar has a cam face 182 adapted to engage a wheel or roller 183, terminally mounted upon the lower end of the spring-actuated latch 155, which functions to retain the deflector 115 in operative position, as shown in Figures 9 and 10. The terminal 184 of the cam bar 178 is offset and is substantially parallel with the major portion of the bar 178, and is positioned above the rollers 183, as shown in Figure 10. The parts are shown in normal position in Figure 10.

In the operation of the above described mechanism, the packages will be diverted from the main conveyer section 112 onto the branch conveyer 21 by the deflector 115, positioned as shown in Figure 9. As the packages pass from the main conveyer downwardly over the gravity branch conveyer 21, each package will pass over the rocker arm 171 without contacting with the rollers 172, mounted thereon. However, the rocker arm 165 will be actuated as a result of the packages engaging the rollers 166 and depressing them below the surface of the rollers of the branch conveyer, as the packages pass thereover. During such movement of the rocker arm 165, the crank arm 177 will be oscillated from the full to the dotted line position, shown in Figure 10, as a result of its connection with the rock shaft 164 through the connection 168 and arms 169. Oscillation of the crank arm 177 will longitudinally move or reciprocate the cam bar 178 from the full to the dotted line position shown in Figure 10, such movement, however, being insufficient to cause the cam face to engage the rollers 183. Such movement, therefore, has no effect upon the latch 155, which during the diversion of the packages onto the branch conveyer, retains the deflector 115 in its operative position, shown in Figure 9. The distance between the rocker arms 165 and 171 is greater than the maximum length of the packages passing thereover, so that when a package has passed over the rocker arm 171 and engages the rollers 166 upon the rocker arm 165, the rocker arm 171 may be oscillated to the vertical position, shown in dotted lines in Figure 10. When the package passes over the rocker arm 165, the latter will be moved to the dotted line position shown in Figure 10.

However, should the discharge end of the branch conveyer 21 become congested, causing the packages to fill or block the conveyer adjacent to the main conveyer, as shown in Figure 11, then the above described mechanism will automatically be actuated to depress or move the latch 155 out of engagement with the deflector 115 which, by the action of the weighted arm 119, will be returned to its normal open or inoperative position, shown in full lines in Figure 9, thereby automatically interrupting the diversion of following articles onto the branch conveyer 21. Following articles will thereafter travel along the main conveyer to be returned to the dispatcher or to another destination.

Blocking or overflowing of the branch conveyer causes the above described mechanism to be actuated in the following manner; as soon as the conveyer has been filled to the point where one of the packages will come to rest over the rock shaft 164 of the rocker arm 165, the latter will be retained in the dotted line position, shown in Figure 10, thereby causing the rocker arm 171 to be held in substantially a vertical position with the rollers 172 positioned above the rollers of the conveyer in the path of the next following package. As the next following package passes over the rock shaft 163, the forward end thereof will engage the rollers 172 and rock the arm 171 with the resultant oscillation of the crank arm 177 from the dotted line position in Figure 10 to the dotted line position shown in Figure 11, thereby causing the cam bar 178 to be actuated to move the cam face 182 into engagement with the roller 183 with the resultant depressing of the latch 155 out of engagement with the end of the deflector 115. Such movement of the latch 155 permits the deflector to return to its normal inoperative position, as shown in Figure 9.

Following packages may thereafter be returned to the dispatcher as a warning that the selected branch conveyer has been filled, and another routing tray may then be sent out over the main conveyer with the control pin positioned to actuate the deflector operating mechanism of another branch conveyer, as for instance, one of the branch conveyers 22 or 23. As soon as the accumulation of packages in the congested branch conveyer have been removed the rocker arms 165 and 171 will be returned to their normal position by the action of the tension springs 173, thereby causing the return of the cam bar to the full line position in Figure 21, which will permit the latch to be returned to its normal operative position as a result of the cam face 182 being moved out of engagement with the roller 183. Before articles or packages can again be diverted onto the branch conveyer 21, another routing tray must be sent out over the main conveyer to re-actuate the deflector mechanism for that particular branch conveyer. Such actuation of the deflector-operating mechanism is, as hereinbefore stated, governed by the transverse position of the control pin upon the routing tray. The constructional details of the routing tray and its control means, and also the mechanism for diverting packages from the main conveyer onto a selected branch conveyer, forms the subject matter of my above mentioned pending application, and it is therefore not claimed in this application.

I claim as my invention:

1. A conveying apparatus comprising in combination, a main conveyer having a branch conveyer connected therewith, means for diverting packages or articles from said main conveyer onto said branch conveyer, and means adapted to be operated only by the accumulation of packages on said branch conveyer adjacent to said main conveyer to actuate said diverting means to prevent following articles from being diverted onto said branch conveyer.

2. An apparatus of the class described, comprising in combination, a main conveyer, a plurality of branch conveyers connected therewith, mechanism for diverting packages or articles from the main conveyer onto a selected branch conveyer, and means on said branch conveyers operable only by the accumulation of packages thereon to actuate said mechanism to prevent the further diversion of articles onto said branch conveyer.

3. An apparatus of the class described, comprising in combination, a main conveyer, branch conveyers connected therewith, a mechanism on said main conveyer for each branch conveyer selectively operable to divert packages from the main conveyer onto a selected branch conveyer, and means on each of said branch conveyers operatively connected with one of said mechanisms permitting the normal passage of packages or articles thereover uninterrupted, and said means being operable only by the accumulation of packages on its associated branch conveyer, adjacent said main conveyer to automatically operate said diverting mechanism to prevent the further diversion of packages onto its complementary branch conveyer.

4. The combination with a main conveyer having a branch conveyer connected therewith, of a pivotally mounted deflector for diverting articles from the main conveyer onto the branch conveyer, a spring-actuated latch member for retaining said deflector in operative position over said main conveyer, and means mounted on said branch conveyer and operable only by the accumulation of packages thereon, adjacent to said main conveyer, to disengage said latch member from said deflector to permit the latter to move to its inoperative position to prevent the further diversion of packages onto said branch conveyer.

5. The combination with a main conveyer having a branch conveyer connected therewith, of a deflector pivotally mounted on said main conveyer and adapted to divert packages therefrom onto said branch conveyer, means tending normally to retain said deflector in open inoperative position, a spring-actuated latch member engageable with said deflector to retain it in operative package-diverting position, and a cam device carried by said branch conveyer and operable only by the accumulation of packages thereon to release said latch member from said deflector to permit the latter to return to open inoperative position.

6. An apparatus of the class described comprising in combination, a main conveyer having a branch conveyer leading therefrom, a pivotally mounted deflector on said main conveyer adapted to divert packages therefrom onto the branch conveyer, means tending normally to retain said deflector in open inoperative position, spring-actuated means for retaining said deflector in operative position, and mechanism on said branch conveyer permitting the normal passage of packages thereover without actuating said deflector but operable by the accumulation of packages on said branch conveyer adjacent to said main conveyer, to disengage said spring-actuated means from said deflector to permit the latter to return to its open inoperative position, to prevent the further diversion of articles from the main conveyer onto said branch conveyer.

7. An apparatus of the class described, comprising a main conveyer and a branch conveyer, a deflector for diverting articles from the main conveyor onto said branch conveyer, a spring-actuated latch member engageable with said deflector to retain it in operative package-diverting position, a cam bar connected with said latch member, and means also connected with said cam bar and operable only by the accumulation of packages upon said branch conveyer to actuate said cam bar to move said latch member out of engagement with said deflector, thereby permitting the latter to return to its open inoperative position.

8. An apparatus of the class described, comprising a main conveyer and a branch conveyer, a deflector on said main conveyer adapted to divert packages therefrom onto said branch conveyer, lock means for retaining said deflector in package-diverting position, a shaft mounted beneath the branch conveyer and having a connection with said lock means, an oscillatable member secured to the shaft and normally positioned below the surface of said branch conveyer, and means on said branch conveyer, operable by the passage of packages thereover, to initially rotate said shaft to move said member above the surface of said branch conveyer in position to be engaged by a following package, whereby said member will be operated to complete the rotation of said shaft to effect the release of said deflector and permit it to return to its normal inoperative position, thereby automatically interrupting the further diversion of packages onto said branch conveyer.

9. In a conveying system, a main conveyer, a branch conveyer leading therefrom, a deflector for diverting commodities from said main conveyer to said branch conveyer, means for holding said deflector in operative position, means actuated only by the accumulation of commodities on said branch conveyer to render said deflector holding means inoperative, and means for moving said deflector to inoperative position.

10. In a conveying system, a main conveyer, a branch conveyer leading therefrom, a deflector adapted to divert commodities from said main conveyer to said branch conveyer, a latch member for holding said deflector in operative position, means actuated only by the accumulation of commodities on said branch conveyer for releasing said latch member, and means for moving said deflector to inoperative position after the release of said latch member.

11. In a conveying system, a main conveyer, a branch conveyer leading therefrom, a deflector adapted to divert commodities from said main conveyer to said branch conveyer, means for holding said deflector in operative position, mechanism associated with said branch conveyer permitting the normal passage of commodities thereover and actuatable only by the accumulation of commodities on said branch conveyer adjacent said main conveyer to render said deflector holding means inoperative, and means for moving the deflector to inoperative position after said holding means has been released.

In witness whereof, I have hereunto set my hand this 14th day of February, 1927.

MARTIN J. ANDERSON.